United States Patent [19]

Keusch

[11] 4,007,521
[45] Feb. 15, 1977

[54] AUTOMATIC PRECISION WORKING TOOL

[75] Inventor: Andreas Keusch, Brossard, Canada

[73] Assignee: Hans Seiler, Aargau, Switzerland

[22] Filed: Apr. 23, 1976

[21] Appl. No.: 679,488

[52] U.S. Cl. .................. 29/38 C; 408/45; 408/71; 82/DIG. 9
[51] Int. Cl.[2] ................ B23P 23/00; B23G 1/20
[58] Field of Search .......... 29/38 A, 38 C; 408/42, 408/43, 44, 45, 71; 82/DIG. 9

[56] References Cited

UNITED STATES PATENTS

| | | | |
|---|---|---|---|
| 1,958,844 | 5/1934 | Bullard | 29/38 A |
| 2,814,216 | 11/1957 | Goodwin | 408/45 |
| 3,056,981 | 10/1962 | Byam | 408/45 X |
| 3,203,316 | 8/1965 | Cashman et al. | 29/38 A |
| 3,689,965 | 9/1972 | Bertiglio | 29/38 C |

*Primary Examiner*—Harrison L. Hinson
*Attorney, Agent, or Firm*—Diller, Brown, Ramik & Wight

[57] ABSTRACT

This invention relates to an automatic precision apparatus which includes an elongated rotatable central shaft concentric with and encased by a fixed outer cylinder. A rotary workpiece table is fixed to the central shaft adjacent one end of the central shaft, and a round tool holder table is fixed to the cylinder adjacent one end of the cylinder and disposed in spaced relationship with the rotary table and in parallel arrangement with the rotary table. A plurality of spaced tool holders are disposed around the round table, and a plurality of equally spaced workpiece holders are disposed on one surface of the rotary table facing the round table. Each tool holder is precisely aligned with a respective one of the workpiece holders and is alignable with every other one of the workpiece holders. In one embodiment of the invention, a piston and cylinder arrangement is provided for moving the shaft to a second position relative to the cylinder from a first position relative to the cylinder, and from the second position back to the first position, and a further piston and cylinder arrangement is provided for rotating the shaft relative to the cylinder when the shaft is in the first position relative to the cylinder. An indexing arrangement, consisting of two parallel plates with facing surfaces having a plurality of indentation groups spaced therearound, pairs of indentation groups being aligned with each other, and insert means between the indentation groups is provided for releasably attaching the shaft to the cylinder when the shaft is in the second position relative to the cylinder. Thus, when the shaft is in the first position, the rotary table is rotatable, with the shaft, relative to the round table, which is fixed to the cylinder, to move each workpiece holder from their positions adjacent one of the tool holders to a new position adjacent another one of the tool holders. Further, when the shaft is in the second position, a closed vibration path is provided from each workpiece, through its respective workpiece holder, through the arrangement for releasably attaching, through the cylinder, through a respective tool holder adjacent each workpiece holder, through the tool in the respective tool holder and back to the workpiece.

8 Claims, 6 Drawing Figures

AUTOMATIC PRECISION WORKING TOOL

BACKGROUND OF THE INVENTION

1. Field of the Invention

The invention relates to an automatic precision apparatus wherein a closed loop is formed between each tool and its respective workpiece so that, should the tool vibrate, the workpiece will vibrate together with the tool, and should the workpiece vibrate, the tool will vibrate together with the workpiece, so that there will not be any vibration of a tool relative to a workpiece or vice versa.

2. Description of the Prior Art

Machines, including a plurality of tools mounted, by means of holding shafts, on a stationary table around a rotary table and angularly spaced therearound, are known in the art. The tools are mounted around and over the rotary table which carries the workpieces. In such tools, the workpieces are moved to different stations, each station containing a different tool, and a different work step is carried out on the workpiece by the different tools at each of the stations.

In such machines, it is common practice to have the means for moving the rotary table mounted underneath the table, on the machine base, while the shafts for carrying the individual tools are supported by a flange-like means extending from the machine base around the rotary table. In such prior art machines, a rotary table is not directly mechanically connected to the tool holding shaft, if the rotary table should vibrate, it will vibrate relative to the tool holding shaft. Accordingly, a workpiece would vibrate relative to the tool working on that workpiece. In the same way, if the tool holding shaft should vibrate, then a tool would vibrate relative to the workpiece on which it is working.

Such relative vibration can cause misalignment as between the working tool and the workpiece so that the precision of such machines deteriorates.

As will be appreciated, all of the above tools will require some indexing means to locate a tool adjacent its workpiece as the tools or workpieces are rotated relative to each other. Such indexing, and especially high precision indexing at high speeds, is very difficult to accomplish.

The indexing problem has been attacked in the prior art, and U.S. Pat. No. 3,552,242, Morgan Jr., et al, issued Jan. 5, 1971, U.S. Pat. No. 2,403,405, Sirola, issued July 2, 1946, U.S. Pat. No. 3,621,736, Stanley, issued Nov. 23, 1971, U.S. Pat. No. 2,471,403, Benes, issued May 31, 1949 and U.S. Pat. No. 2,908,195, Benes, issued Oct. 13, 1959 all relate to turrets for lathes which include indexing devices. The indexing devices in each of the above patents include metal balls which are retained in indentations in plates. In all of the above patents, the balls are also spring biased, and it is always the tool holding plate which is rotated relative to the workpiece.

U.S. Pat. No. 3,699,844, Perminov, issued Oct. 24, 1972, teaches an indexing system which consists of metal balls disposed in seating indentations of parallel plates. The indentations are, of course, disposed in facing surfaces of the plates. In the Perminov patent, the balls are rigidly fixed in the upper plates.

The problem of vibration has also been attacked in the prior art, and U.S. Pat. No. 3,153,953, Edgar, issued Oct. 27, 1974, teaches the use of an aligning bar precision index which acts to dampen vibration in an indexing turret. It is also known in the prior art to move the workpiece retaining means relative to the tools. This is shown in U.S. Pat. No. 1,278,407, Werth, issued Sept. 10, 1918, U.S. Pat. No. 1,499,456, Hartmann, issued July 1, 1924, and U.S. Pat. No. 2,783,688, Gunderson, issued Mar. 5, 1957.

SUMMARY OF THE INVENTION

None of the teachings of the prior art take the approach to prevent such relative vibration as is taken by the applicant herein, to wit, to provide an apparatus wherein is provided a closed vibration loop as between each tool and the workpiece on which the tool is working whereby the tool and the workpiece will vibrate together.

It is therefore an object of the invention to provide an apparatus which will eliminate or greatly reduce the precision deteriorating effects of vibration.

It is a more specific object of the invention to provide such an apparatus wherein a closed vibration loop is provided as between each tool on the apparatus and the workpiece on which the tool is working.

In accordance with the invention an automatic precision apparatus comprises an elongated rotatable central shaft concentric with and encased by a fixed outer cylinder; a rotary workpiece table fixed to said central shaft adjacent one end of said central shaft; a round tool holder table fixed to said cylinder adjacent one end of said cylinder and disposed in spaced relationship with said rotary table and in parallel arrangement with said rotary table; a plurality of spaced tool holders disposed around said round table; a plurality of equally spaced workpiece holders disposed on the one surface of said rotary table facing said round table; each tool holder being precisely aligned with a respective one of said workpiece holders and being alignable with every other one of said workpiece holders; means for moving said shaft to a second position relative to said cylinder from a first position relative thereto, and from said second position back to said first position; means for rotating said shaft relative to said cylinder when the shaft is in said first position relative to said cylinder; and means for releasably attaching said shaft to said cylinder when said shaft is in said second position relative to said cylinder; whereby, when said shaft is in said first position, said rotary table is rotatable, with said shaft, relative to said round table, fixed to said cylinder, to move each workpiece holder from their positions adjacent one of the tool holders to a new position adjacent another one of the tool holders; and whereby, when said shaft is in said second position a closed vibration path is provided from each workpiece, through its respective workpiece holder, through said means for releasably attaching, through said cylinder, through a respective tool holder adjacent each workpiece holder, through the tool in the respective tool holder and back to the workpiece.

The means for attaching may comprise a first circular indexing ring disposed on and fixed to said one surface of said rotary table; a second circular indexing ring disposed between said one circular ring and said round table and in parallel relationship with said one circular indexing ring, said second circular indexing ring being fixed to said cylinder; a plurality of aligned, equally spaced, seating indentation groups in the facing surfaces of said first and second circular indexing rings said plurality of seating indentation groups in each facing surface being at least equal to a plurality of equally spaced workpiece holders; and precisely machined inserts in each facing pair of said seating indentation groups.

The means for rotating may comprise a first plate fixed to said shaft adjacent the other end thereof; a second plate disposed between said first plate and said rotary table in parallel relationship with said first plate and attached to a fixed surface; a plurality of aligned seating indentations in the facing surfaces of said first and second plates; precisely machined inserts in each facing pair of seating indentations; and rotating means for rotating said second plate to a new position from its original position and, thereafter, for returning said second plate to its original position; wherein, when said shaft is in its first position, said first plate is releasably attached to said second plate to thereby rotate with said second plate, whereby said first plate and said shaft, fixed to said first plate, and said rotary table, fixed to said shaft, will all rotate with said second plate when said shaft is in its first position; and wherein said first plate is unattached from said second plate when said shaft is in its second position, whereby said second plate will be returned to its original position when said shaft is in its second position without altering the position of said first plate, said shaft and said rotary table.

The means for moving may comprise a piston and cylinder table fixed to and disposed at the other end of said cylinder; a ring-like piston disposed on the surface of said piston and cylinder table remote from said round table; a ring-like cylinder disposed over said piston in operating arrangement therewith; said ring-like cylinder being unreleasably attached to said shaft; and means for providing air to the interior of said ring-like cylinder and means for expelling air from the interior of said ring-like cylinder; whereby, when air is provided to said ring-like cylinder, by said means for providing air, said ring-like cylinder will be moved, from an original position relative to said ring-like piston carrying with it said shaft to the second position thereof; and whereby, when said air is expelled from said ring-like cylinder, by said means for expelling air, said ring-like cylinder will return to its original position carrying with it said shaft to the first position thereof.

BRIEF DESCRIPTION OF THE DRAWINGS

The invention will be better understood by an examination of the following description together with the accompanying drawings in which.

DETAILED DESCRIPTION OF THE DRAWINGS

Figure 1:
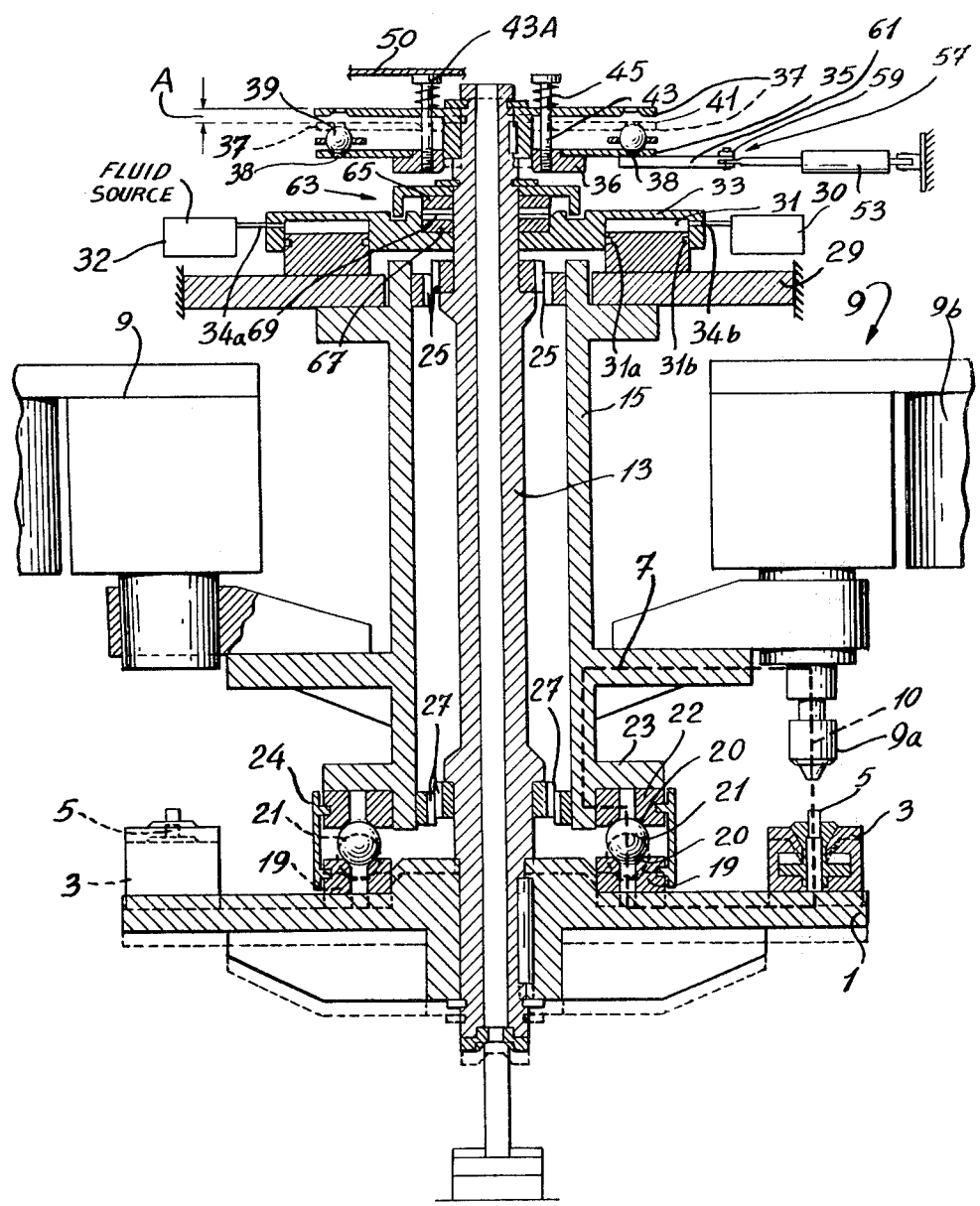
FIG. 1 is a cross-section of the apparatus in accordance with the invention.

Referring now to the drawings, the apparatus includes a rotary table 1 for carrying a plurality of workpiece holders such as chucks 3 in which are mounted workpieces 5. A round stationary table 7 is disposed in spaced arrangement with table 1 and is parallel thereto. Mounted around the table 7 are a plurality of tool holders 9 which are precisely aligned relative to the chucks 3. Each tool holder is adapted to receive a tool 9a which is driven by a motor or other driving means 9b.

The plurality of chucks 3 are preferably equally spaced around the table 1, and the apparatus can include a like plurality of tool holders or like equal spacing.

As is well known in the art, the tools receivable in the tool holders can comprise drills, taping tools, etc.

The rotary table 1 is fixedly attached to a shaft 13 which is coaxial with a cylinder 15. If desired, the table 1 can be integrally formed with the shaft 13. The shaft 13 and the cylinder 15 form a piston and cylinder like arrangement.

Figure 2:
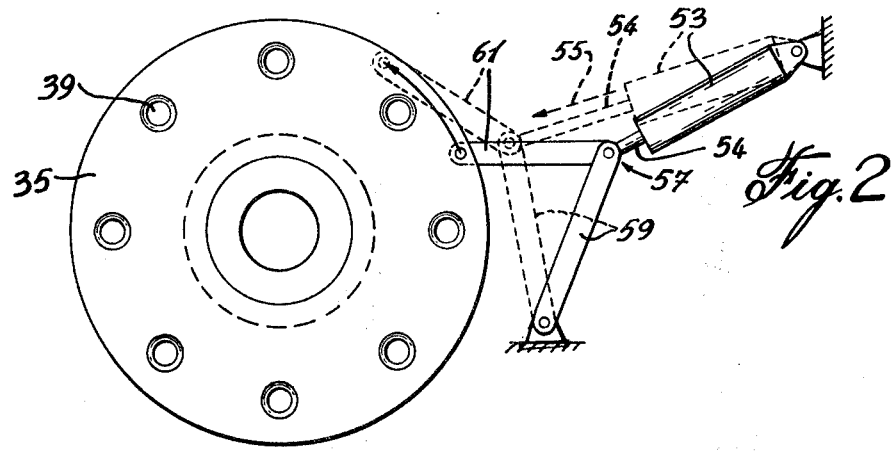
FIG. 2 shows the piston and cylinder lever arrangement for rotating the rotatable table.
Figure 5:
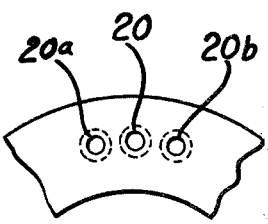
FIG. 5 is a fragmental portion of FIG. 4 showing a further embodiment.
Figure 4:
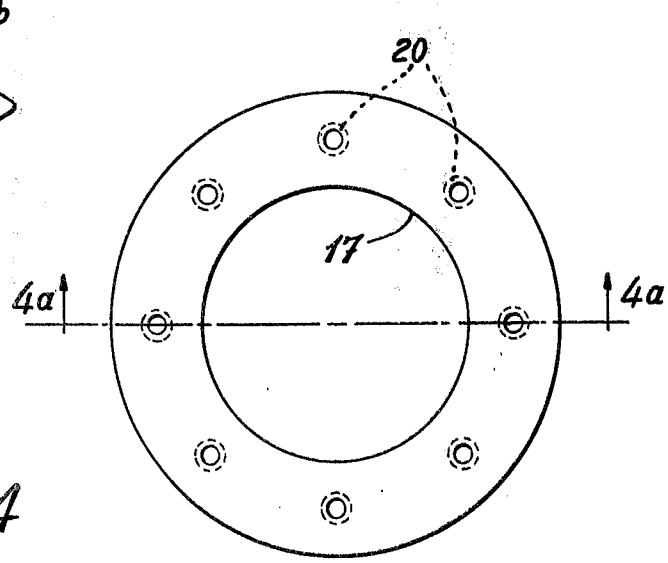
FIG. 4 is a top view of FIGS. 3a and 3b.

Fixedly attached at the surface of the table 1, which surface faces the table 7, is a ring-like indexing means 19. As can be seen in FIGS. 2 and 5, the ring 19 comprises a plurality of seating indentations 20. In a preferred embodiment, the plurality of seating indentations is equal to the plurality of chucks or workpieces on the table 1. However, the plurality of indentations could be an even multiple of the plurality of workpieces.

Figure 3A:
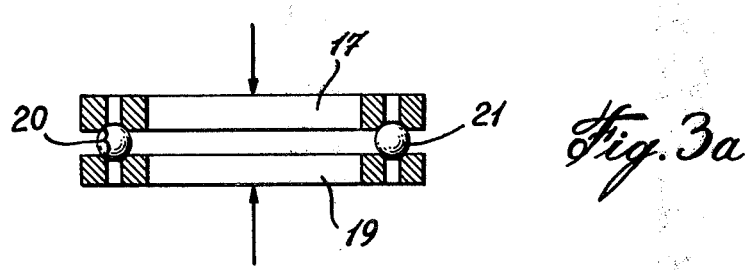
FIGS. 3a and 3b are parallel plate indexing means in accordance with the invention.
Figure 3B:
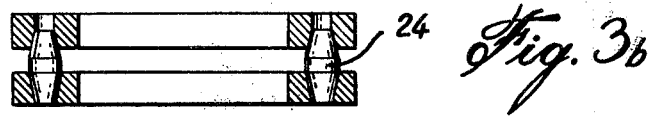

Extending near the bottom end of the cylinder 15 is a flange 23 which carries, on the bottom surface thereof, a second circular ring 22. The second circular ring comprises a like plurality of indentations, and, the rings are arranged so that the indentations are on the facing surfaces of the rings. All of the indentations are precisely machined to be, within very close tolerances, identical to each other, and the indentations on the surface of the ring 19 are aligned with respective indentations on the facing surface of the ring 22. Disposed in each pair of indentations is an insert 21 such as a sphere illustrated in FIGS. 2 and 3a. However, the insert need not comprise a sphere and a different insert, namely, a pair of back to back truncated cones 24, is illustrated in FIG. 3b.

Surrounding the indexing ring 19 and the second ring 22, and fixed thereto, is a stretchable circular band 24. The band 24 is stretchable in the longitudinal direction of the machine (up and down in FIG. 1), and is provided to prevent inserts 22 from falling out of the machine.

The indentations are equally spaced around the rings 19 and 22 and, in fact, when the plurality of indentations is equal to the plurality of workpieces, then the angular spacing as between each indentation will be equal to the angular spacing as between each workpiece.

Disposed between the cylinder 15 and the shaft 13 at the upper and lower ends respectively thereof are guide bearings having bearing surfaces 25 and 27. These bearing surfaces permit the upward and downward movement of the shaft 13 relative to the cylinder 15, and they also permit the shaft 13 to be rotated relative to the cylinder 15 as will be seen below.

At the upper end of the cylinder 15, and supported on a flange, is a piston and cylinder table 29. The outer periphery of 29 is supported by the frame of the apparatus, or some other fixed surface, to be in a fixed position. As 29 is fixed to cylinder 15, 15 is also in a fixed position. Supported on the table 29 is a ring-like piston and cylinder arrangement including a ring-like piston 31, covered by and in operating position with a ring-like cylinder 33. Rubber bands 31a and 31b permit the movement of the piston 31 relative to the cylinder 33 while providing air tight engagements between the outer surface of the piston and the inner surface of the cylinder. The cylinder also includes openings 34a, through which a fluid such as air can be supplied to the interior of the piston from a source 32, and an opening 34b through which air can be expelled from the cylinder via automatically controllable means 30 which can comprise a valve.

Disposed at the top end of the shaft 13 is an arrangement for rotating the shaft 13 relative to the cylinder 15. The arrangement includes a first plate 37 fixedly attached to the shaft 13. Disposed below the plate 37 is a plate 35 which is in parallel arrangement with the plate 37. The plate 35 is held in position by means such as bolts 43 whose top end is attached to the frame of the apparatus or to some other fixed surface. The plates 35 and 37 include, on the facing surfaces thereof, a plurality of seating indentations 38 and 41 respectively, the indentations being equally spaced around the plates 35 and 37, and pairs of indentations in the two plates being aligned. Each pair of indentations comprises an insert member such as the sphere 39. As in the ring-like members 19 and 22, the indentations are precisely machined as are also the insert members 39.

Coiled springs 45 are included on the means 43 between the top surface of the plate 37 and the fixed surface to which the means 43 are attached for purposes as will be explained below.

A pivoting piston and cylinder arrangement 53, which is attached at one end thereof to the frame of the apparatus or to some other fixed surface, is attached at the other end thereof to the plate 35. As can be seen in FIGS. 1 and 2, the piston rod 54 of the piston and cylinder arrangement is attached to the junction of pivotable levers 59 and 61. The other end of lever 59 is also attached to a fixed surface such as the frame of the machine, and the other end of the lever 61 is attached to the plate 35. In FIG. 2, the solid lines show the piston 54 in its retracted position, and the dotted lines indicate the position of the various parts of 57 with the piston 54 extended into its extended position in the direction of the arrow 55.

The arrangement 63, including upper and lower plates 65 and 67 respectively having bearing surfaces 69, is included for fixing the cylinder 33 to the shaft 13 in one position of the shaft as will be discussed below.

In operation, the apparatus works as follows. With the apparatus disposed as shown in solid lines in FIG. 2, each workpiece 5 is disposed adjacent a respective tool so that the respective tools are in an operating position. The workpieces are held in this position because the interior of the cylinder 33 is filled with air as will be seen below. The tools will work on the adjacent workpiece for a predetermined period of time, after which it will be necessary to advance each workpiece to a further station for working by different tools. In order to advance the workpieces, the following sequence of steps takes place:

At the conclusion of the predetermined period of time, a signal is sent from a source (not shown) to the motor of each tool to turn off the motors. At the same time, a signal is sent from the same source to the means 30 to permit the air to escape from the interior of the cylinder 33. As the air escapes, the cylinder 33 and shaft 13 will be pulled down by the force of gravity and will carry with them plate 37 and table 1. The downward position of the shaft, the plate 37, the table 1, the ring 19, the ball 20, the workpiece holder 3 and the workpiece 5 are all shown in dotted lines. As can be seen, with the shaft in its downward position, the spheres 20 will no longer be embedded in the indentations 20 of the upper ring 22. Accordingly, it will be possible for the lower ring 19 to rotate relative to the upper ring 22.

At the same time, the workpieces will be lowered enough so that they clear the bottom edges of their adjacent tools in the respective tool holder. Accordingly, it will be possible to move the workpieces relative to the tools.

At the upper end of the shaft, the plate 37 will now be disposed so that the spheres 39 are embedded in the indentations 41 of the plate 37. Spring 45 will force plate 37 downwardly so that there will be a rigid connection as between plates 35 and 37 through the spheres 39. Thus, when plate 35 rotates, plate 37 will rotate with it.

It is noted that the distance that plate 37 must be lowered to contact 39 (A in FIG. 1) is less than the distance the plate actually moves. Thus, if A is ¼ inch, the plate 37, together with the shaft 13, will move 5/16 inch, so that when 37 is fully lowered, tops 43A of bolts 43 will clear the upper surface 50 so that the arrangement of the plates 37 and 35 will be movable relative to the upper surface 50. Spring 45 will provide a compression force to urge the plates 35 and 37 together.

After the shaft has attained its lowermost position the bottom of the shaft, or the bottom surface of table 1, or the bottom surface of table 37, could activate a switch which would then provide a signal to piston and cylinder arrangement 53, which is in its original position as shown in solid lines in FIG. 2, to instruct the piston and cylinder arrangement to extend its piston rod 54 outwardly in the direction of arrow 55. With the piston rod 54 extending in its outward position, the levers 59 and 61 assume the positions shown in dotted lines in FIG. 2, i.e., the piston 61 will force the plate 35 to rotate in a counter clockwise direction. As the plate 37 is now rigidly connected to the plate 35, the plate 37 will rotate with the plate 35. As plate 37 is fixed to the shaft 13, the shaft will also rotate, and, as the table 1 is fixed to the shaft 13, the table will also rotate in a counter clockwise direction.

As will be obvious, the directions of rotation could be changed without departing from the invention.

As the spacing between indentations in the plates 35 and 37 is made, to a high degree of tolerance, to be identical to the spacing between work stations, each workpiece will now be advanced to its sequentially next work station.

When the piston rod 54 reaches the end of its outward stroke a signal means, actuated either by the piston rod 54, or the plates 35 or 37, would be provided to the fluid source 32 and the means 30 to instruct the means 30 to close the opening 34b and instruct the fluid source 32 to provide fluid through the opening 34a. With the fluid provided to the interior of the cylinder 33, the cylinder 33 will be lifted in an upward direction and it will carry with it the shaft 13. Accordingly, the ring 19 will assume the position shown in solid lines in FIG. 2, i.e., ring 19 will be mechanically attached to ring 22 by inserts 21. At this point, a signal will be provided to the cylinder and piston arrangement 53 to retract the rod 54 to thereby return the levers 59 and 61 to the position shown in solid lines in FIG. 2. When the levers are so returned, plate 35 will be rotated in a clockwise direction back to its original position and ready for the next stroke. When the shaft 13 was lifted in an upward direction, the plate 37 was disconnected from the plate 35 so that, when the plate 35 moved in the counter clockwise direction, it did not carry the plate 37 with it. Accordingly, the shaft 13 was not rotated in a clockwise direction.

With the arrangement as shown in solid lines in FIG. 2, a closed vibrational loop is formed through each tool, through its associated workpiece, through the associated workpiece holder, through table 1, through ring 19, insert 21, and ring 22, through the cylinder 15, through the table 7, through the tool holder and back to the tool as shown in heavy dotted lines 10 in FIG. 2. Because of this closed vibrational loop, if any force were to cause a tool to vibrate independently and relative to its associated workpiece, the workpiece will now vibrate in unison with the tool so that there will not be any misalignments due to the vibration of a tool relative to the workpiece or vice versa. Accordingly, the potential precision of which the inventive apparatus is capable is greatly enhanced.

It is also contemplated, in accordance with the invention, to have groups of equally spaced indentations in the rings 19 and 22 (and correspondingly in the plates 37 and 38) as shown at 20a and 20b in FIG. 5. Such an arrangement is useful when there is a requirement for working at two closely adjacent areas on the workpiece. The spacing between the indentations would correspond with the spacing between the areas of working. With this arrangement, there are two inserts, and the two inserts would be contained in the two forward indentations of the ring 19 (i.e., when the ring is rotating in a counter clockwise direction, then the inserts would be carried by the two left hand indentations on the ring — that is, the indentations 20a and 20 in FIG. 5).

In the operation of an arrangement using groups of indentations, when a workpiece is being rotated from one work station to the other, in the first stroke, the two forward indentations of the ring 19 will be aligned with the two last indentations of the ring 22. After work is done at the first position of the workpiece, with a shorter stroke, the table is advanced so that the three indentations of the ring 19 are aligned with the three indentations of the ring 22. Thus, the workpiece will have been advanced by an amount equal to the distance between the indentations 20 and 20a relative to the tool, and a second piece of work can be done on the same workpiece at this distance from the previous piece of work.

With the arrangement just described, if only one piece of work is to be done on a workpiece, then the short stroke would be eliminated, and each time the table rotates, all three of the indentations of the lower ring 19 would be aligned with all three of the indentations of the upper ring 22.

The indentations on the plates 37 and 38 would be lined up in a similar fashion.

In a further modification, it is also possible to use the tool to work from the bottom upwardly on the workpiece. With such a modification, the peripheral edge of the table 7 would extend beyond the edge of the table 1. The table would then extend downwardly below the table 1 and inwardly beneath the table 1. The tool would then be carried on the top surface of the table 7 so that it is directed at the workpiece.

Although preferred embodiments have been described and discussed above, it will be appreciated that further modifications could be made without departing from the scope of the instant invention. Thus, means other than the ring-like piston and cylinder arrangements 31 and 33 could be used for the purposes of raising and lowering the shaft 13. Specifically, a toggle arrangement similar to the arrangements 53, 57, 59 and 61 above described could be employed. Again, although the machine has been described as operating in a vertical position, it will be appreciated that the apparatus can operate equally well disposed in a horizontal attitude. Further, in either the vertical or horizontal attitude, an arrangement different from the piston and cylinder arrangement 53 could be used for the purpose of rotating the plate 35. Also, the cylinder 15 could be secured in a fixed position at a point other than the outer periphery of the table 29.

The preferred embodiments were described for the purpose of illustrating, but not limiting, the invention, and the various modifications, as above mentioned, and other modifications, are all within the scope of the invention as defined in the appended claims.

I claim:
1. An automatic precision apparatus comprising;
an elongated rotatable central shaft concentric with and encased by a fixed outer cylinder;
a rotary workpiece table fixed to said central shaft adjacent one end of said central shaft;
a round tool holder table fixed to said cylinder adjacent one end of said cylinder and disposed in spaced relationship with said rotary table and in parallel arrangement with said rotary table;
a plurality of spaced tool holders disposed around said round table;
a plurality of equally spaced workpiece holders disposed on the one surface of said rotary table facing said round table;
each tool holder being precisely aligned with a respective one of said workpiece holders and being alignable with every other one of said workpiece holders;
means for moving said shaft to a second position relative to said cylinder from a first position relative thereto, and from said second position back to said first position;
means for rotating said shaft relative to said cylinder when the shaft is in said first position relative to said cylinder; and
means for releasably attaching said shaft to said cylinder when said shaft is in said second position relative to said cylinder;
whereby, when said shaft is in said first position, said rotary table is rotatable, with said shaft, relative to said round table, fixed to said cylinder, to move each workpiece holder from their positions adjacent one of the tool holders to a new position adjacent another one of the tool holders; and
whereby, when said shaft is in said second position, a closed vibration path is provided from each workpiece, through its respective workpiece holder, through said means for releasably attaching, through said cylinder, through a respective tool holder adjacent each workpiece holder, through the tool in the respective tool holder and back to the workpiece.

2. An apparatus as defined in claim 1 wherein said means for attaching comprises:
a first circular indexing ring disposed on and fixed to said one surface of said rotary table;
a second circular indexing ring disposed between said one circular ring and said round table and in parallel relationship with said one circular indexing ring, said second circular indexing ring being fixed to said cylinder;

a plurality of aligned, equally spaced, seating indentation groups in the facing surfaces of said first and second circular indexing rings, said plurality of seating indentation groups in each facing surface being at least equal to a plurality of equally spaced workpiece holders;

and precisely machined inserts in each facing pair of said seating indentations.

3. An apparatus as defined in claim 2 wherein each said seating indentation group comprises three indentations.

4. An apparatus as defined in claim 2 wherein each said seating indentation group comprises only a single indentation.

5. An apparatus as defined in claim 2 wherein said inserts comprise spheres.

6. An apparatus as defined in claim 2 wherein said inserts comprise back to back truncated cones.

7. An apparatus as defined in claim 1 wherein said means for rotating comprises:

a first plate fixed to said shaft adjacent the other end thereof;

a second plate disposed between said first plate and said rotary table in parallel relationship with said first plate and attached to a fixed surface;

a plurality of aligned seating indentations in the facing surfaces of said first and second plates;

precisely machined inserts in each facing pair of seating indentations; and rotating means for rotating said second plate to a new position from its original position and, thereafter, for returning said second plate to its original position;

wherein, when said shaft is in its first position, said first plate is releasably attached to said second plate to thereby rotate with said second plate, whereby said first plate and said shaft, fixed to said first plate, and said rotary table, fixed to said shaft, will all rotate with said second plate when said shaft is in its first position; and wherein said first plate is unattached from said second plate when said shaft is in its second position, whereby said second plate will be returned to its original position when said shaft is in its second position without altering the position of said first plate, said shaft and said rotary table.

8. An apparatus as defined in claim 1 wherein said means for moving comprises:

a piston and cylinder table fixed to and disposed at the other end of said cylinder;

a ring-like piston disposed on the surface of said piston and cylinder table remote from said round table;

a ring-like cylinder disposed over said piston in operating arrangement therewith;

said ring-like cylinder being unreleasably attached to said shaft; and means for providing air to the interior of said ring-like cylinder and means for expelling air from the interior of said ring-like cylinder;

whereby, when air is provided to said ring-like cylinder, by said means for providing air, said ring-like cylinder will be moved, from an original position relative to said ring-like piston carrying with it said shaft to the second position thereof; and whereby, when said air is expelled from said ring-like cylinder, by said means for expelling air, said ring-like cylinder will return to its original position carrying with it said shaft to the first position thereof.

* * * * *